(12) United States Patent
Curcio et al.

(10) Patent No.: US 7,733,830 B2
(45) Date of Patent: Jun. 8, 2010

(54) ENHANCING STREAMING MEDIA RECEPTION FOR A MOBILE DEVICE DURING CELL RESELECTION

(75) Inventors: Igor D. D. Curcio, Tampere (FI); Miikka Lundan, Tampere (FI)

(73) Assignee: Nokia Corporation, Espoo (FI)

( * ) Notice: Subject to any disclaimer, the term of this patent is extended or adjusted under 35 U.S.C. 154(b) by 1369 days.

(21) Appl. No.: 10/674,902

(22) Filed: Sep. 29, 2003

(65) Prior Publication Data

US 2004/0071088 A1 Apr. 15, 2004

(30) Foreign Application Priority Data

Oct. 14, 2002 (FI) ................................. 20021820

(51) Int. Cl.
*H04Q 7/00* (2006.01)
(52) U.S. Cl. .................. 370/333; 370/331; 370/332; 370/334; 370/545; 370/543; 455/436; 455/437; 455/439
(58) Field of Classification Search ............. 370/331, 370/332, 543, 545, 334, 333; 709/231; 455/436, 455/437, 439
See application file for complete search history.

(56) References Cited

U.S. PATENT DOCUMENTS

| 6,363,412 B1* | 3/2002 | Niwa et al. .................. 709/203 |
| 2002/0004840 A1 | 1/2002 | Harumoto et al. |
| 2002/0141740 A1 | 10/2002 | Matsui |
| 2003/0002460 A1* | 1/2003 | English ....................... 370/331 |
| 2003/0009576 A1* | 1/2003 | Apostolopoulos et al. ... 370/331 |
| 2003/0112792 A1* | 6/2003 | Cranor et al. ................ 370/352 |
| 2003/0114158 A1* | 6/2003 | Soderbacka et al. ......... 455/436 |
| 2003/0185286 A1* | 10/2003 | Yuen .......................... 375/152 |
| 2003/0200326 A1* | 10/2003 | Leighton et al. ............ 709/231 |
| 2004/0008688 A1* | 1/2004 | Matsubara et al. ...... 370/395.21 |
| 2004/0042491 A1* | 3/2004 | Sarkkinen et al. ........... 370/469 |

FOREIGN PATENT DOCUMENTS

| JP | 11-187367 | 7/1999 |
| WO | 9847302 | 11/1998 |
| WO | 01-30090 | 4/2001 |
| WO | 0130090 | 4/2001 |
| WO | 02/45372 | 6/2002 |

OTHER PUBLICATIONS

Canadian Office Action issued in corresponding Canadian Patent Application No. 2,500,781 dated Apr. 8, 2008 (5 pages).
3GPP TS 26.233 v5.0.0 (Mar. 2002), 3rd Generation Partnership Project; Technical Specification Group Services and System Aspects; Transparent end-to-end Packet Switched Streaming Service (PSS); General Description, (Release 5), 3GPP.

(Continued)

*Primary Examiner*—Vincent P Harper
*Assistant Examiner*—Fred A Casca

(57) ABSTRACT

The invention relates to a method for streaming of media from a streaming server (111) to a mobile client device (101) over an air-interface, wherein, after a cell reselection, the method comprises requesting the streaming server (111) to resend streaming media which the mobile client device (101) was not able to receive due to the cell reselection.

42 Claims, 7 Drawing Sheets

OTHER PUBLICATIONS

"Deployment of IP Multimedia Streaming Services in Third-Generation Mobile Networks" by Hector Montes et al; IEEE Wireless Communications, Oct. 2002, pp. 84-92.

Japanese Office Action (2 pages) issued Feb. 26, 2008 in corresponding Japanese Patent Application No. 2004-544332 (corresponding to International Application No. PCT/FI03/000752).

English Translation (pp. 1-4) of Japanese Office Action issued Feb. 26, 2008 in corresponding Japanese Patent Application No. 2004-544332 (corresponding to International Application No. PCT/FI03/000752).

Proceedings of the 11$^{th}$ International Workshop on Network and Operating Systems Support for Digital Audio and Video, NOSSDAV 2001, Jun. 25-26, 2001, pp. 125-133.

Japanese Office Action dated Oct. 28, 2008, 2 pages Japanese original; 3 pages English translation.

Patent Abstracts of Japan, Publication No. 11-187367; Date of Publication: Jul. 9, 1999, 1 page.

* cited by examiner

ENHANCING STREAMING MEDIA RECEPTION FOR A MOBILE DEVICE DURING CELL RESELECTION

CROSS REFERENCE TO RELATED APPLICATION

Priority is claimed under 35 USC 119 from Finnish application FI 20021820, filed Oct. 14, 2002.

FIELD OF THE INVENTION

The invention relates to streaming of media from a streaming server to a mobile client device over an air-interface.

BACKGROUND OF THE INVENTION

A packet switched streaming service PSS is currently being standardized for mobile environment by 3GPP (3$^{rd}$ Generation Partnership Project). An example of a communications system capable of streaming media (streaming video and/or audio) is shown in FIG. 1. The system comprises a streaming server 111 which is coupled to an IP-network (Internet Protocol) 104. The IP-network 104 may be, for example, the Internet or a service provider operator's intranet (an intranet network belonging to the operator's domain). The IP-network 104 is coupled to a core network 103 of a mobile communications network via a $G_i$ interface. The mobile communications network also has a radio access network (RAN) 102 coupled to the core network 103. The radio access network 102 provides mobile communications devices 101 with access to the mobile communications network over an air-interface. Said access may be provided either by circuit switched means (circuit switched voice or data call) or packet switched means or both. In the following, GPRS (General Packet Radio Service) is used as an example of a packet switched means to communicate over the air-interface. Concerning GPRS, the generic term radio access network (RAN) is considered to comprise base (transceiver) stations (BS) and base station controllers (BSC).

In streaming media a sequence of 'moving images' (i.e. video) or sound (i.e. audio) or a sequence of 'moving images' together with sound (i.e. multimedia) is sent in a compressed form from the streaming server 111 to a mobile communications device 101 (hereinafter referred to as a client device 101). In contrast to the technique in which an entire media file has to be arrived at the client before it can be played, the streaming technique enables sending of media (video and/or audio) from the streaming server 111 to the client device 101 in a continuous manner and playing of the media as it arrives at the client.

When media is streamed in cellular mobile communications systems such as the system presented in FIG. 1, new problems specific to the mobile environment arise. These problems are mostly due to the different restrictions of mobile systems. One such problem arises in a cell reselection (i.e. handover) situation presented in FIG. 2.

In FIG. 2, a first base station BS1 of the radio access network 102 serves the area of a first cell 201 whereas a second base station BS2 of the radio access network 102 serves the area of a second cell 202. Before cell reselection, the client device 101 is served by the first base station BS1, i.e. the client device 101 has an active radio link with the first base station BS1. This situation is shown on the left side of the FIG. 2. After the cell reselection, the client device 101 is served by the second base station BS2. The radio link with the first base station BS 1, shown by a dotted line, is dropped. This situation is shown on the right side of the FIG. 2.

The cell reselection (CR) can be divided in three periods in time:
a) Pre-CR period
b) CR period
c) Post-CR period.

During the pre-CR period, received signal quality in the first cell weakens and the client device 101 starts cell reselection signaling. The client device 101 is able to receive streaming media via the first base station BS1 during that period. During the CR period, the actual cell reselection is performed. The client device 101 can not receive streaming media during that period. During the post-CR period, the client device 101 is able to receive streaming media via the second base station BS2.

The cell reselection may cause a long break in service. For example, a cell reselection (CR period) in a case where GPRS is used as radio bearer may take up to 30-40 seconds. This will affect an ongoing streaming session. For example, part of the packets carrying streaming media may be lost and/or freezing of the played media may occur at the client device 101. If the streaming media comprises a video stream, the freezing means that a still image will appear and stay for a period of time on a client device display before the streaming media is again received and can be played again. If the streaming media comprises an audio stream, the freezing means that no sound is played back (i.e. silence) until the CR period is over.

Accordingly, there is a need to find appropriate means for reducing the effects of cell reselection on an ongoing streaming session.

SUMMARY OF THE INVENTION

According to a first aspect of the invention, there is provided a method for streaming of media from a streaming server to a mobile client device over an air-interface, wherein the method comprises:
requesting the streaming server to send streaming media which the mobile client device is not able to receive due to a cell reselection.

A request requesting the streaming server to send the streaming media may be sent from the mobile client device to the streaming server before or after the mentioned cell reselection.

The mentioned request is not limited to requesting to send only the media which the mobile client device is (or was) not able to receive due to the cell reselection (during a cell reselection period). In an embodiment, the request may be construed such that what is actually requested is: resending of a portion of a media content not received as well as sending any remaining portion of the media content.

The term media is considered to mean either video or audio or another media, such as still image, or any combination thereof, i.e multimedia.

Preferably, a resending request is sent in response to the cell reselection. The resending request is preferably an application layer request sent between a mobile client device application and a streaming server application.

In a preferred embodiment, the streaming server is requested to send at an increased speed for a determined period of time in order to increase at the client device a degree of fullness of a temporary store, such as a buffer, in which the streaming media is temporarily stored before playback. Preferably, this is done by by requesting the streaming server to switch from sending a higher bit rate media stream to sending a lower bit rate media stream at an increased speed. The higher and lower bit rate streams are preferably provided by a multi-rate codec.

According to a second aspect of the invention, there is provided a mobile client device for receiving streaming media from a streaming server over an air-interface, the mobile client device comprising:

means for requesting the streaming server to send streaming media which the mobile client device is not able to receive due to a cell reselection.

Preferably, the air-interface couples said mobile client device to a mobile communications network. The mobile client device preferably comprises a cellular mobile phone.

According to a third aspect of the invention, there is provided a streaming server for sending streaming media to a mobile client device over an air-interface, the streaming server comprising:

means for receiving a request requesting the streaming server to send streaming media which the mobile client device is not able to receive due to a cell reselection; and means for acting upon the received request.

According to a fourth aspect of the invention, there is provided a system comprising a streaming server and a mobile client device, for streaming of media from the streaming server to the mobile client device over an air-interface, the system comprising, at the mobile client device:

means for requesting the streaming server to send streaming media which the mobile client device is not able to receive due to a cell reselection, the system further comprising, at the streaming server:

means for receiving the request; and means for acting upon the received request.

According to a fifth aspect of the invention, there is provided a computer program executable in a mobile client device, the computer program comprising:

program code for causing the mobile client device to request the streaming server to send streaming media which the mobile client device is not able to receive due to a cell reselection.

According to a sixth aspect of the invention, there is provided a computer program executable in a streaming server, the computer program comprising:

program code for causing the streaming server to receive a request requesting the streaming server to send streaming media which the mobile client device is not able to receive due to a cell reselection; and program code for acting upon the received request.

BRIEF DESCRIPTION OF THE DRAWINGS

Embodiments of the invention will now be described by way of example with reference to the accompanying drawings in which.

DETAILED DESCRIPTION

Figure 1:
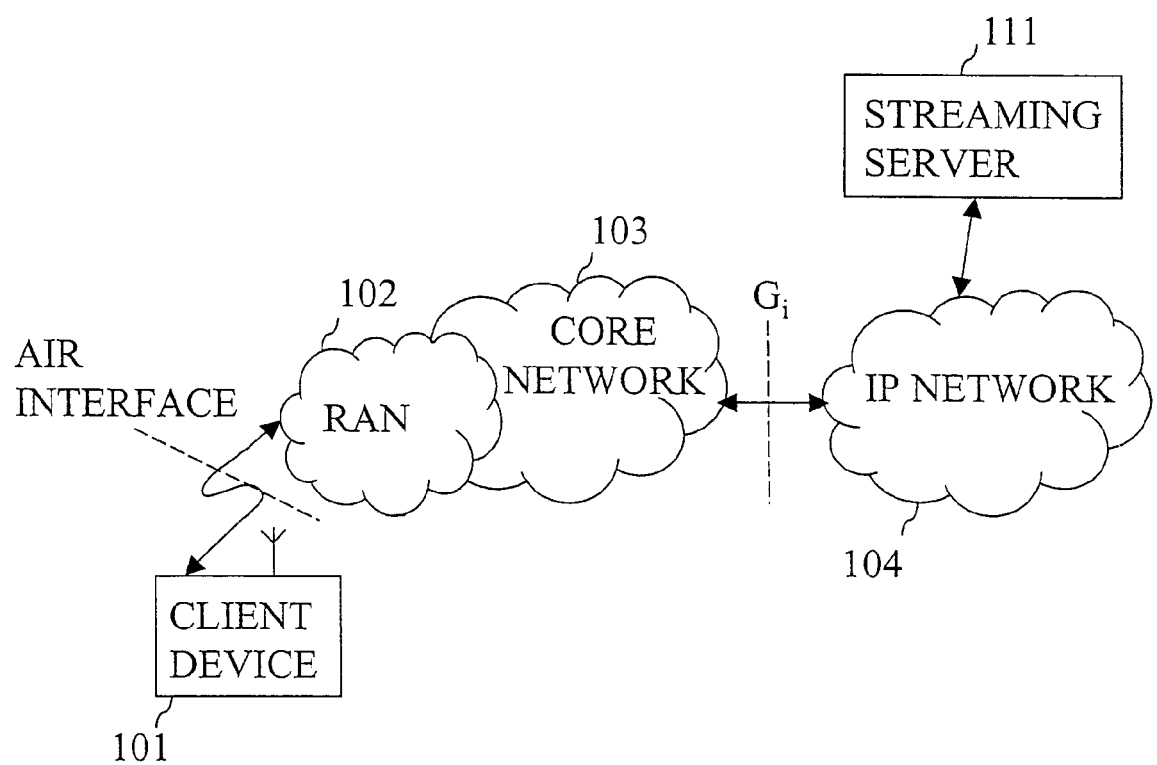
FIG. 1 shows a communications system capable of streaming media.
Figure 2:
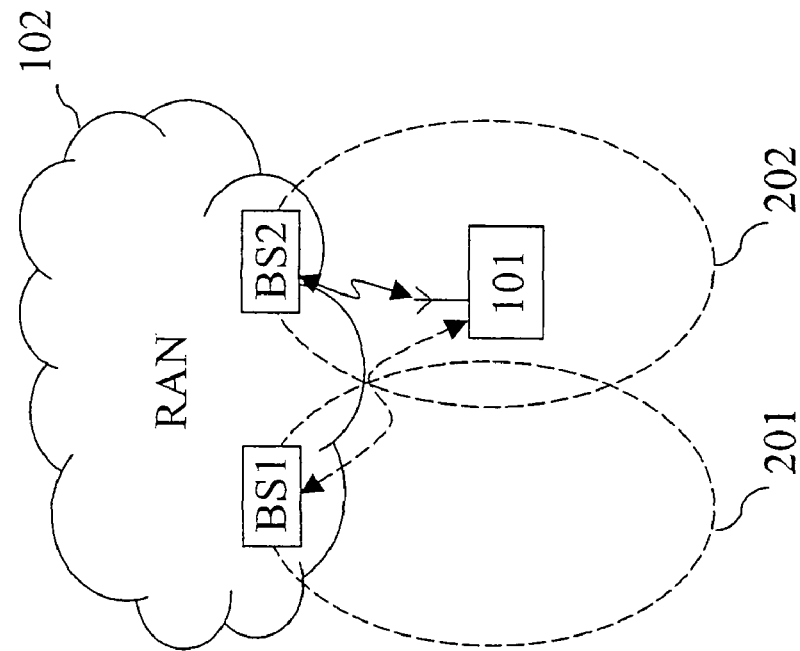
FIG. 2 shows a cell reselection situation in the communications system of FIG. 1.
Figure 2:
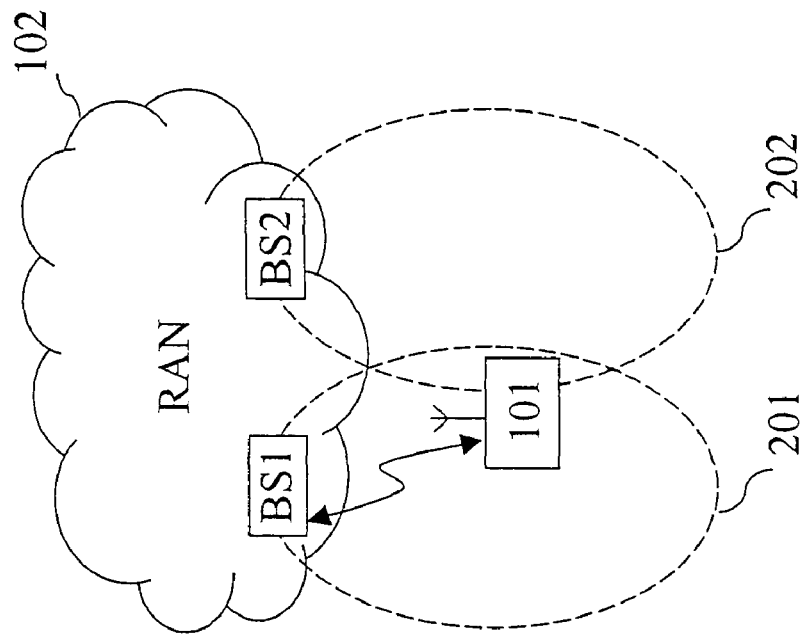

The system shown in FIG. 1 can also be used in the preferred embodiments of the invention (the same applies to FIG. 2). Accordingly, the system comprises a streaming server 111 which is coupled to an IP-network 104. The IP-network 104 may be, for example, the Internet or a service provider operator's intranet. The IP-network 104 is coupled to a core network 103 of a mobile communications network via a $G_i$ interface. The mobile communications network also has a radio access network (RAN) 102 coupled to the core network 103. The radio access network 102 provides mobile communications devices 101 with access to the mobile communications network over an air-interface. Said access may be provided either by circuit switched means (circuit switched voice or data call) or packet switched means or both. In the following, GPRS (General Packet Radio Service) is used as an example of a packet switched means to communicate over the air-interface.

In order to better understand the preferred embodiments of the invention, let us consider the following example.

In this example, a mobile communications device 101 (again referred to as a client device 101) has established a streaming session with the streaming server 111 when being served by the first base station BS1. In this example and in the following description, mostly a video streaming session is considered. However, a corresponding consideration applies to an audio streaming session as well as to a multimedia (e.g. video with audio) streaming session.

RTSP (Real Time Streaming Protocol) protocol is used in the streaming session setup. Once the session has been established, the streaming itself may be performed (i.e. media flow may be sent) according to RTP (Real time Transport Protocol) or another protocol. However, if it is desired to make a change in the established session, this will again be done by using RTSP.

At the beginning of the established streaming session, the received streaming media (media flow), transmitted in packets (or frames), is buffered (i.e. temporarily stored) in a buffer at the client device (hereinafter referred to as a client device buffer). When the client device buffer is full, playing (playback) of the streaming media is started at one end of the buffer while the buffer is continuously filled at the other end with received streaming media. Therefore, the buffer should remain nearly full during normal operation of the system.

The client device now undergoes a cell reselection from the first cell 201 to the second cell 202 (FIG. 2). It is to be noted that, although the radio access network (RAN) 102 is illustrated in FIG. 2 by a single cloud only, it may comprise different radio access networks. It may comprise a GPRS (GPRS-only) RAN, a 3G (third generation) RAN or a combination thereof. The first cell 201 (served by the base station BS1) and the second cell 202 (served by the base station BS2) may therefore be, for example, cells of the GPRS RAN or 3G RAN. Accordingly, the cell reselection (handover) can occur, for example, between base stations belonging to GPRS RAN, between base stations belonging to 3G RAN or between a base station belonging to GPRS RAN and a base station belonging to 3G RAN.

The client device 101 can not receive streaming media during the CR period. Therefore, when the CR period begins the client device buffer starts emptying because the buffer content is further played while the continuous filling is stopped. Depending on the size of the client device buffer, two different cases can be identified:

i) The client device buffer (in time) is shorter than the time that cell reselection takes, i.e. the time to empty a full client device buffer is shorter than the CR period, ii) The client device buffer (in time) is longer than the time that cell reselection takes, i.e. the time to empty a full client device buffer is longer than the CR period.

Figure 3:
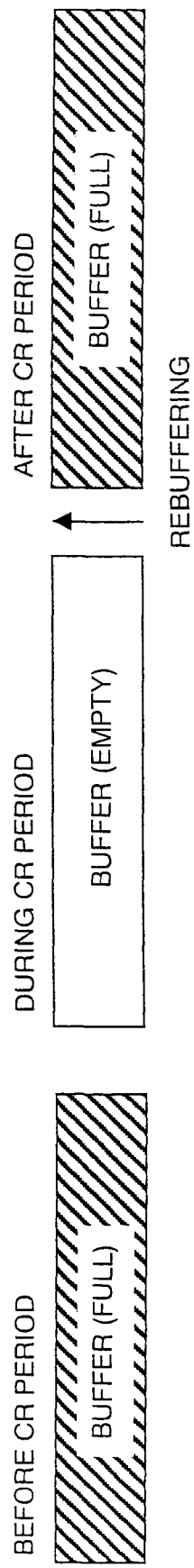
FIG. 3 shows a client device buffer in a situation in which the client device buffer is shorter than the time that cell reselection takes.

In the first case (FIG. 3), the buffer will become totally empty during the CR period. Since the buffer becomes empty, the client device 101 has no media to play anymore. Therefore, the client device 101 starts rebuffering. Rebuffering can be started during the post-CR period. In order to get the rebuffering started the client device 101 can use an RTSP PAUSE/PLAY method. In this method, the client device 101 first sends an RTSP PAUSE message to the streaming server 111. The PAUSE message will cause the server 111 to pause sending of the media flow. Subsequently, the client device 101 sends an RTSP PLAY message which requests the streaming server 111 to start resending the streaming media from the last received frame onwards. Rebuffering starts when the client again starts receiving the streaming media. When the client device buffer is full, playing of the streaming media is restarted from the last received frame onwards. In the meantime, the last received frame is shown as a still image on a client device display. However, in spite of the drawback of showing a still image, no packets are effectively lost since the media flow which is not received at the client device during the CR period is resent from the server 111 to the client device 101 after the CR period.

Figure 4:
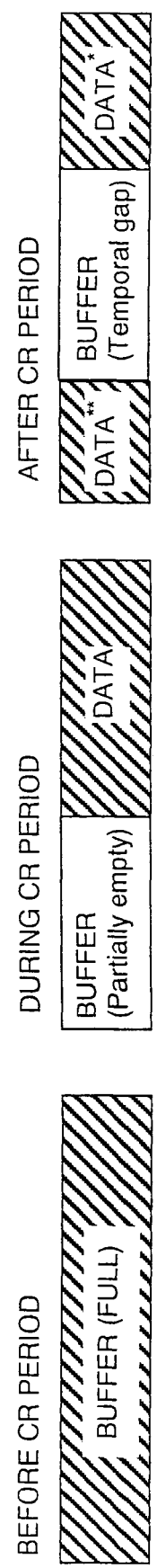
FIG. 4 shows a client device buffer in a situation in which the client device buffer is longer than the time that cell reselection takes.

In the second case (FIG. 4), the whole content of the buffer has not been played during the CR period. Therefore, the buffer only becomes partially empty during the CR period, i.e. there is still streaming media (DATA) in the buffer when the CR period ends. During the post-CR period (after the CR period) playing of the streaming media stored in the buffer before the CR period (i.e. DATA*) is further continued at one end of the buffer while the other end is filled with the streaming media received after the CR period (i.e. DATA**). If nothing is done, DATA* will eventually end and playing is continued with the first frame of data DATA. No still image is shown. However, the first frame of DATA is not the frame that should be played right after the last frame of DATA*. Since the client device 101 could not receive streaming media during the CR period it has not even received the frame that should be showed after the last frame of DATA*. There exists a temporal gap in the buffered media. As a result, the client device 101 will skip showing the sequence of streaming media (video) which could not be received due to the cell reselection Concerning an audio stream, the same effect occurs, i.e. the client device 101 will skip playing sound which could not be received.

Figure 5:
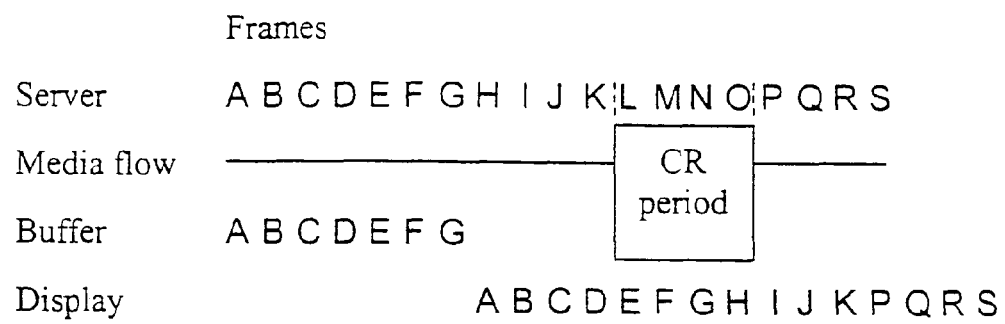
FIG. 5 shows another illustration of the situation which is behind FIG. 4.

The second case is further illustrated with the aid of FIG. 5. It is to be noted that FIG. 5 only shows a very simplified case. The time is considered to flow from left to right in FIG. 5. The streaming media sequence that the server sends comprises video frames A-S. The frames are received at the client device and buffered before playing. The playing of the media starting from frame A starts when the buffer is full (i.e. when the frames A-G have been stored in the buffer), the frames (moving video picture) are subsequently shown on a client device display. The buffering of the frames following frame G is not shown in FIG. 5 for clarity reasons.

The media flow from the server to the client device is not possible during the CR period. Therefore, the client device does not receive the frames L-O. Otherwise, the media flow is perfectly received at the client device. Now that the CR period is shorter than the buffer size, the showing of the frame (frame K) last received before the CR period will be followed by the showing of the frame (frame P) first received after the CR period. Video frames L-O are not shown at all. Concerning an audio stream, the same effect occurs, i.e. the user hears a pause and a temporal gap in the sound.

There exists two type of frames: intra frames and inter frames. The intra frames contain all necessary information of an image whereas inter-frames only contain changes or predicted changes compared to a previous image. The previous image may be an intra frame or an inter frame. Therefore, if the frame P is an intra frame the shown picture only warps ahead in time from frame K to frame P. In this case the frames L-O are simply not shown to the user. But if the frame P is an inter frame severe distortion in the shown (moving) picture is likely to occur before the next intra frame is received and played.

Figure 6:
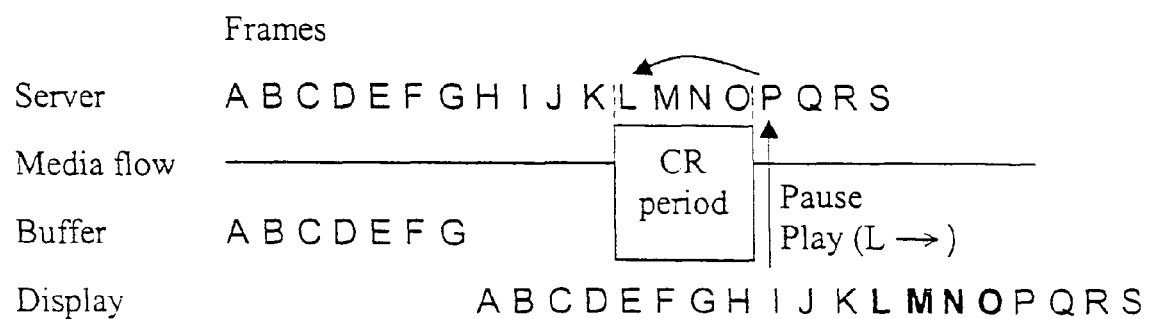
FIG. 6 shows preferred action in a preferred embodiment of the invention.

A preferred embodiment of the invention as shown in FIG. 6 concentrates on the above mentioned problem relating to the second case. In this embodiment, the buffer is longer than the duration of the CR period. Therefore, the buffer does not become totally empty during the CR period but only partially empty. It is to be noted that FIG. 6 only shows a very simplified case. The time is considered to flow from left to right in FIG. 6. The streaming media sequence that the server sends comprises frames A-S. The frames are received at the client device and buffered before playing. The playing of the media starting from frame A starts when the buffer is full, the frames (moving video picture) are subsequently shown on a client device display. The buffering of the frames following frame G is not shown in FIG. 6 for clarity reasons. The media flow from the server to the client device is not possible during the CR period. Therefore, the client device does not receive the frames L-O. Otherwise, the media flow is perfectly received at the client device.

When the CR period is over the client device knows exactly what is the last frame that it has received before the CR period (i.e. during the pre-CR period). In this embodiment it is frame K. The client device then requests, right after the CR period has been ended, the streaming server to start resending the streaming media from the last received frame onwards. Upon receiving the request the streaming server starts resending the media flow. The first frame to be sent is in this embodiment frame L. Any frames sent and received after the CR period but before the resending has started (possibly some frames starting from frame P) are ignored by the client device. When the streaming media (of frames A-K) stored in the buffer before the CR period ends, then the playing is continued with the first frame (frame L) of the resent streaming media received after the CR period. Therefore, no discontinuity in the shown video picture should appear to the user. In FIG. 6, the resent video frames L-O which would have otherwise failed to have been received at the client device are shown in bold font. Correspondingly, concerning an audio stream, the streaming server is requested to start resending the audio stream at a point at which reception has been stopped in the client device. No discontinuity in playback should appear.

In practice, the resending request can be performed by the RTSP PAUSE/PLAY method. In this method, the client device first sends, after the CR period has been ended, an RTSP PAUSE message to the streaming server. The PAUSE message will cause the server to pause sending of the media flow. However, the playing of the streaming media received at the client device is not paused unless the buffer gets empty (which should not be the case). Subsequently, the client device sends an RTSP PLAY message to the streaming server 111. The PLAY message contains information on the starting point of the resending. At the end of the CR period the client device knows the time of the last received frame. Based on that, the client device determines the starting point before sending the PLAY message. The PLAY message causes the server to start resending.

An example of the PAUSE message is as follows:
PAUSE rtsp://example.com/foo RTSP/1.0
CSeq: 6
Session: 354832

The PAUSE message informs the server that a change is coming. An example of the subsequently sent PLAY message is as follows:
PLAY rtsp://example.com/foo RTSP/1.0
CSeq: 7
Session: 354832
Range: npt=28.00-

The message field 'Range' tells the starting point of resending. In this example, the starting point is 28 seconds from the start of the streaming media sequence. In relation to the embodiment shown in FIG. 6, this point would be exactly the time of frame L in the streaming media sequence.

In the embodiment just described, the frames (packets) that were lost during the CR period will be resent from the server to the client device. Also, since the buffer size is longer than the duration of the CR period, no interruption in the shown video picture should appear and the user experience is maximized.

However, as the case is such that during normal streaming the degree of fullness of the buffer does not change, since the buffer is emptied (played) at the same rate as it is filled, this may cause an additional problem. In the embodiment just described, after the cell reselection, the client device buffer stays emptier than before, for the reasons as described in the foregoing. Therefore if, for example, a new cell reselection is to be performed in a near future, the emptier buffer may cause the same drawback as discussed in connection with the first case above (i.e. the case in which the client device buffer was shorter than the time that cell reselection takes).

A preferred embodiment of the invention concentrates on the above identified problem. In this embodiment, to ensure smooth behavior of the shown video picture (correspondingly: played sound), the client device buffer is filled after the CR period, for a period of time, at a higher rate than it is emptied (played). This period may be called a filling period. When the filling period is over the buffer is full again and normal streaming in which the buffer is filled at the same rate as emptied is resumed.

It is to be noted that normally raising the degree of fullness of the buffer would require the playing to be paused. In the present embodiment, playing is not paused but the degree of fullness of the buffer can still be raised due to a clever buffer management technique taught according to the present invention in which the buffer is filled, during playing, at a rate higher than the playing rate.

To raise the degree of fullness of the buffer without pausing the playback, the client device, in this embodiment, requests the server to switch to sending a lower bit rate streaming media sequence, but to use in the actual sending the same transmission bit rate (hereinafter referred to as an original transmission bit rate) as before. In order to reach the original transmission bit rate the client device requests the server to speed up the transmission of the lower bit rate sequence by a speeding factor. Speeding up the transmission bit rate causes more data to be written in the buffer than read out from the buffer. Therefore, the degree of fullness of the buffer increases as desired.

In other words, the server is asked to switch from sending the original sequence encoded at a first bit rate to sending a new corresponding sequence encoded at a second bit rate lower than the first bit rate and to increase the transmission bit rate of the new sequence in order to reach the original transmission bit rate (bandwidth). It is to be noted that the bit rate at which a media stream is encoded (and will be decoded) is a different concept than the transmission bit rate. The bit rate at which the media stream has been encoded has an effect on the picture quality. If the media stream has been encoded at a higher bit rate, this means that more bits have been used in encoding compared to encoding at a lower bit rate. This typically results in a better picture quality. The transmission bit rate, on the other hand, is the bit rate at which the media stream is actually sent and it depends on the available bandwidth.

The request to switch to sending a lower bit rate sequence and to speed up the transmission bit rate can be delivered by using the RTSP PAUSE/PLAY method. When the client device desires to fill the client device buffer during the post-CR period, it first sends a PAUSE message, corresponding to the one presented already in the preceding description, to the server to indicate that a change is coming. Subsequently it generates a PLAY message and sends it to the server.

An example of such a PLAY message is as follows:
PLAY rtsp://example.com/foo RTSP/1.0
CSeq: 7
Session: 354832
Range: npt=28.00-40.00
Bandwidth: 20000
Speed: 1.5

This message contains two optional message fields, namely 'Bandwidth' and 'Speed' to be understood at the client device and streaming server. These fields are already specified as optional fields by the IETF (Internet Engineering Task Force) in the standard RFC 2326 (Real Time Streaming Protocol).

The message field 'Bandwidth' tells the server to change into sending a lower bit rate sequence (here: a sequence whose bit rate is 20 kbps) and the message field 'Speed' tells the server to speed up the sending by a speeding factor (here: 1.5). The message field 'Range' tells the starting point and stopping point in the streaming media sequence in time units (calculated from the beginning of the streaming media sequence(s)).

The PLAY message shown would suit for an example in which the server initially sends a 30 kbps bit rate sequence at an original transmission bit rate of 30 kbps and in which the server, in order to fill the buffer, is desired to switch into sending a sequence whose bit rate is 20 kbps and to speed up the sending at a speeding factor 1.5 to reach the original transmission bit rate of 30 kbps during a 12 seconds filling period (i.e. between the time instants of 28 and 40 seconds of the media sequence).

If the client knows the possible bit rate options (they are typically communicated from the server to the client during session setup, for example, with the aid of a 200 OK response to an RTSP DESCRIBE message) it can calculate the speeding factor needed to reach the original bitrate using the following formula:

$$\text{speeding factor} = \frac{\text{original transmission bit rate}}{\text{new transmission bit rate}}$$

When the buffer is full, the client device sends another RTSP PAUSE and PLAY message pair to the server. An example of the PLAY message is as follows:
PLAY rtsp://example.com/foo RTSP/1.0
CSeq: 67
Session: 354832
Range: npt=40.00-
Bandwidth: 30000
Speed: 1.0

This exemplary message requests the server to start sending the (original) 30 kbps bit rate media sequence (Bandwidth: 30000) at the original transmission bit rate 30 kbps (Speed: 1.0) starting from the time instant 40 seconds of the media sequence (Range: npt=40.00-).

The client device can calculate the length of the buffer filling period using the following formulas:

$$\text{filling period} = \frac{LowSeqTime}{\text{speeding factor}}$$

wherein $$LowSeqTime = (BufferSize - BufferData) \cdot \frac{\text{original transmission bit rate}}{\text{original transmission bit rate} - \text{new transmission bit rate}}$$

In these formulas, LowSeqTime indicates the duration of the lower bit rate sequence playing time in the client device, BufferSize indicates the size of the buffer in seconds and BufferData indicates the data left in the buffer in seconds.

Figure 7:
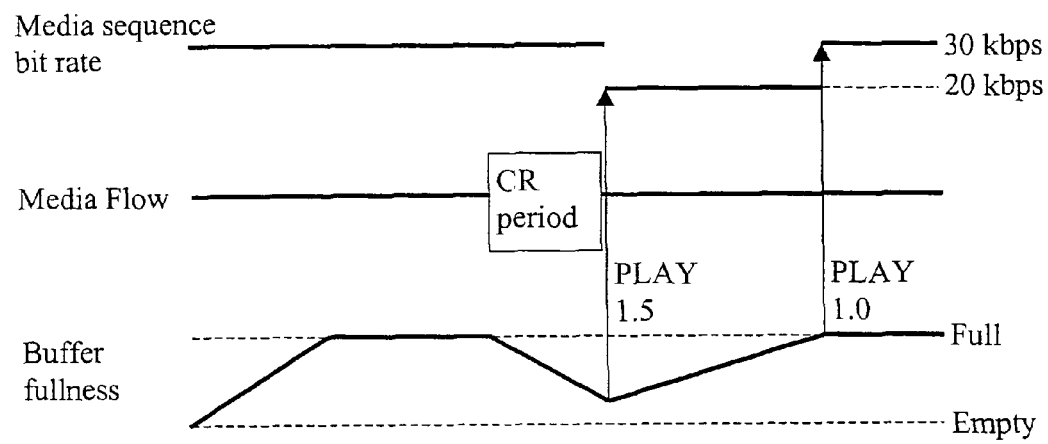
FIG. 7 illustrates a preferred embodiment of the invention.

The filling of the buffer is illustrated in FIG. 7. It is to be noted that FIG. 7 only shows a very simplified case. All delays, for example, have been ignored. The time is considered to flow from left to right in FIG. 7. It can be seen that the buffer starts emptying when the CR period starts. Upon receiving the first PLAY message the server switches to sending a media sequence having a lower bit rate (here: 20 kbps) and speeds up the sending by a speeding factor (here again: 1.5). Since the speeding factor is 1.5, the buffer filling takes twice the time that the emptying period lasted. For example, if the emptying period lasted for 25 seconds, the filling period should be 50 seconds with this speeding factor. When the buffer is full the second PLAY message is sent and the server switches to sending the original media sequence having a higher bit rate (here: 30 kbps) and continues sending at the original transmission bit rate.

In the foregoing, it has been described that, for example, a video stream typically comprises both intra and inter frames, wherein the intra frames are 'independent frames' containing all necessary information of an image whereas inter-frames only contain changes or predicted changes compared to a previous image. In the following preferred embodiment of the invention, the timing of the switch from the lower bit rate sequence to the original bit rate sequence is more closely described in this respect.

Figure 8:
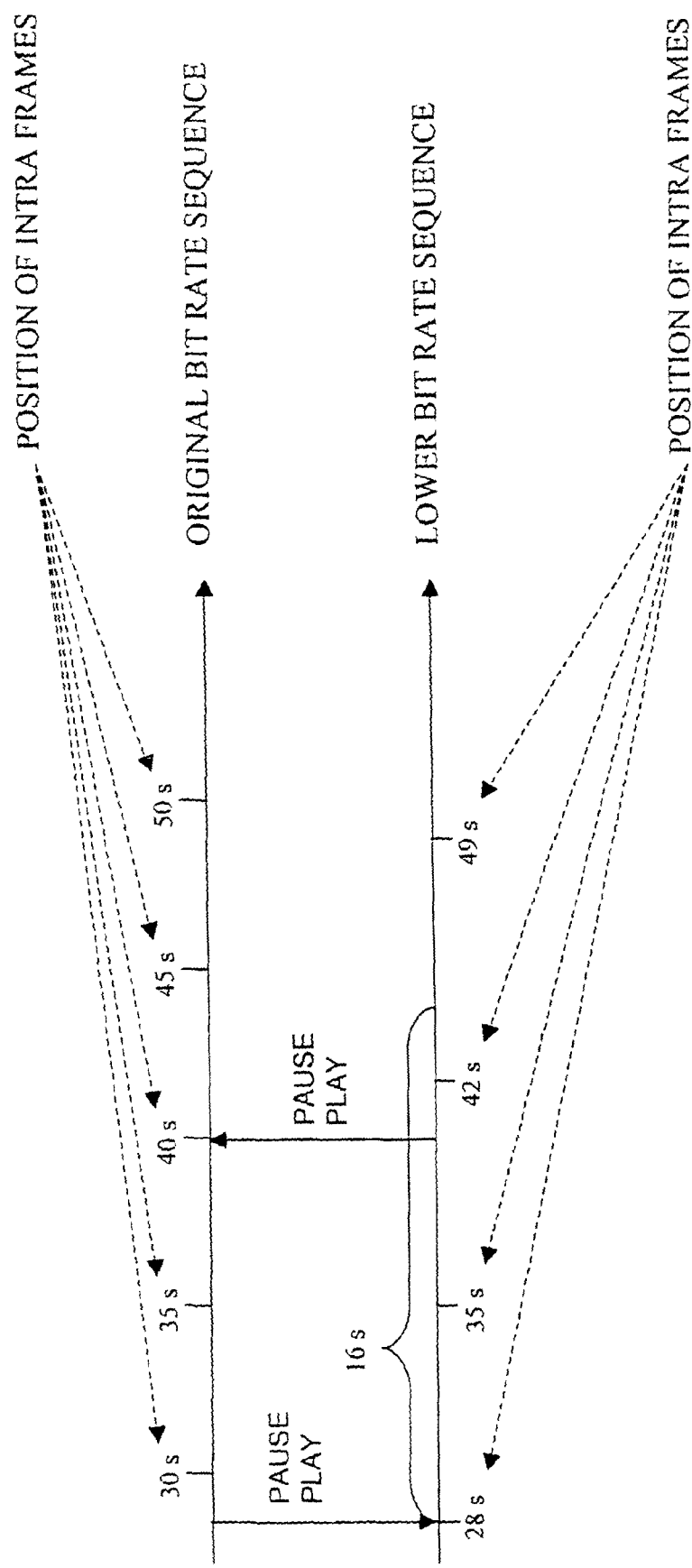
FIG. 8 illustrates a preferred embodiment of the invention.

In this embodiment the purpose is to time, whenever possible, the switch from the lower bit rate sequence to the original bit rate sequence to take place at the point of an intra frame of the original bit rate sequence (or, more generally, at the point of an intra frame of the sequence to which the sending is switched). In this way, prediction errors and/or jumps in media (frame) flow can be avoided. FIG. 8 illustrates this embodiment. It is to be noted that FIG. 8 only shows a simplified case. The time is considered to flow from left to right in FIG. 8. In this embodiment, the first switch from the original bit rate sequence to the lower bit rate sequence is effected at point 28 seconds with the aid of a first PAUSE/PLAY message pair.

As illustrated in FIG. 8, the position of intra frames in the original bit rate sequence may differ from the ones of the lower bit rate sequence. However, based on:
- the time required to totally fill the buffer, i.e. 'filling period',
- the time distance of two adjacent intra frames in the original sequence, i.e. an intra frame rate, '$IFrameTime_{Original}$', and
- the time at which the first switch from the original bit rate sequence to the lower bit rate sequence is effected, i.e. 'SwitchTime', it can be calculated a suitable point in time for swiching back to the original bit rate sequence. The parameter '$IFrameTime_{Original}$' can be calculated in the client device from the original bit rate sequence before switching to the lower bit rate sequence. The calculation of the suitable point in time for swiching back to the original bit rate sequence can be performed using the following formula:

$$SeqChangeTime = IFrameTime_{Original} * \left\lfloor \frac{SwitchTime + \text{filling period}}{IFrameTime_{Original}} \right\rfloor$$

In this formula, 'SeqChangeTime' indicates the point in time for swiching back to the original bit rate sequence and the brackets indicate a floor-function (or trunc-function) which truncates the fractional part of the value computed in the brackets. For example, if the time required to totally fill the buffer, i.e. 'filling period' is 16 seconds, the time at which the first switch is effected, i.e. 'SwitchTime' is 28 seconds and the time difference between two adjacent intra frames in the original sequence, i.e. '$IFrameTime_{Original}$' is 5 seconds, then the point in time for swiching back to the original bit rate sequence is 40 seconds (Seq ChangeTime=5*floor((28+16)/5)=40 s). Accordingly, the second PAUSE/PLAY message pair is sent at point 40 seconds, as indicated in FIG. 8.

In this embodiment, the starting point and stopping point to be placed in the message field 'Range' of the PLAY message are 28 seconds and 40 seconds, respectively. It is to be noted that, due to the intra frame rate, it might not in all cases be possible to totally fill the buffer. For example, in the example just described, it would have taken 4 seconds more to totally fill the buffer. However, the formula gives the closest suitable intra frame to the buffer filling period.

In another embodiment, it may well be that, at the point of the last received frame before the CR period, there is not an intra frame in the lower bit rate media sequence. In this embodiment, the starting point of the resending request is adjusted by a necessary amount of frames (or time) backwards such that there will be an intra frame in the lower bit rate sequence at the starting point. In this case, a set of last received frames before the CR period, which belong to a time period subsequent to the starting point, are ignored at the client device in order to guarantee a continuous playback.

In another embodiment of the invention, the switches between two different bit rate sequences are performed without the timing method(s) just described. In this embodiment, the first switching point (from higher to lower bit rate sequence) is directly determined by the last received frame and the second switching point (from lower to higher bit rate sequence) is directly determined by the the time required to totally fill the buffer ('filling period'). The switching points can therefore end up being at the point of an intra or inter frame. Should a switching point end up being at the point of an inter frame (for example a P-frame), a small prediction error may occur in the played media, however, in this embodiment, the buffer can be totally filled.

Another way to perform switching is to use so called "switch frames". These are frames which contain "difference" information between corresponding frames in different bit rate sequences. In this embodiment, a bridge and switch between the two sequences is performed with the aid of these frames using the difference information.

Figure 9:
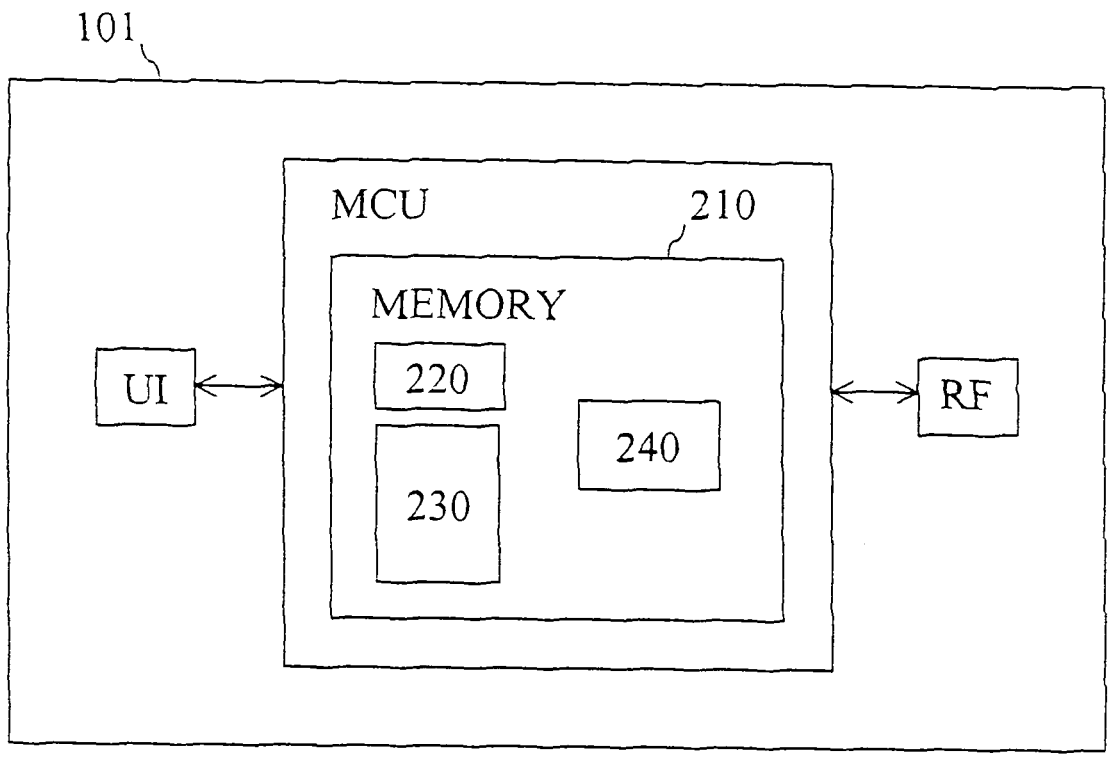
FIG. 9 shows a client device according to a preferred embodiment of the invention.

FIG. 9 shows a client device 101 according to a preferred embodiment of the invention. The client device may be a mobile station of a cellular radio telephone network. The client device 101 comprises a processing unit MCU, a radio frequency part RF, and a user interface UI. The radio frequency part RF and the user interface UI are coupled to the processing unit MCU. The user interface UI typically comprises a display, one or more speaker and a keyboard (not shown) with the aid of which a user can use the device 101.

The processing unit MCU comprises a processor (not shown), a memory 210 and computer software. The software has been stored in the memory 210. The aforementioned client device buffer 240 is also comprised in the memory 210. The processor controls, in accordance with the software, the operation of the client device 101, such as receiving of the streaming media sent from the server 111 and sending of requests to the server 111 via the radio frequency part RF, reading and writing of received streaming media (video and/or audio) in the buffer 240, and presenting of the received streaming video on the display and audio on the one or more speaker of the user interface UI. A suitable size of the buffer (in time) can be, for example, 1.5 or 2 times the maximum (or average) CR period time.

The software comprises a streaming client software application 220 (hereinafter referred to as client software 220), a protocol stack 230 for implementing the necessary protocol layers such as an RTP layer, an RTSP layer, an SDP (Session Description Protocol) layer, a TCP layer (Transmission Control Protocol), an IP layer and, below the IP-layer, lower protocol layers. In addition, the software comprises as a part of the client software 220 a media player for playing the received media.

The processor generates, based on the client software 220 the aforementioned PAUSE and PLAY messages and sends them to the server 111 via the radio frequency part RF. The processor also performs, based on the client software 220, the necessary calculations relating to the speeding factor, relating to the buffer filling period and relating to the suitable point in time for swiching from a lower bit rate sequence back to the original bit rate sequence.

The generation and sending of the resending request (PLAY message) and other appropriate action is triggered by a cell reselection event occurred in the mobile client device 101. The event can be detected by the client software 220 by reception of an asynchronous message from an API (Application Programming Interface) provided by the lower layers of the protocol stack 230. Alternatively or in addition, the event can be detected by monitoring the buffer level, i.e. the degree of fullness of the client device buffer 240. In this case, if the buffer 240 does not receive data for a certain amount X of time (depending on the implementation, the parameter X can be defined as a constant value, and it is a threshold for the client software 220 to understand that the cell reselection event has occurred), and if the client device 101 afterwards starts to receive data after a certain variable amount Y of time (wherein Y>X, and Y is the real duration of the CR period), then the client can trigger the action described in this description.

Figure 10:
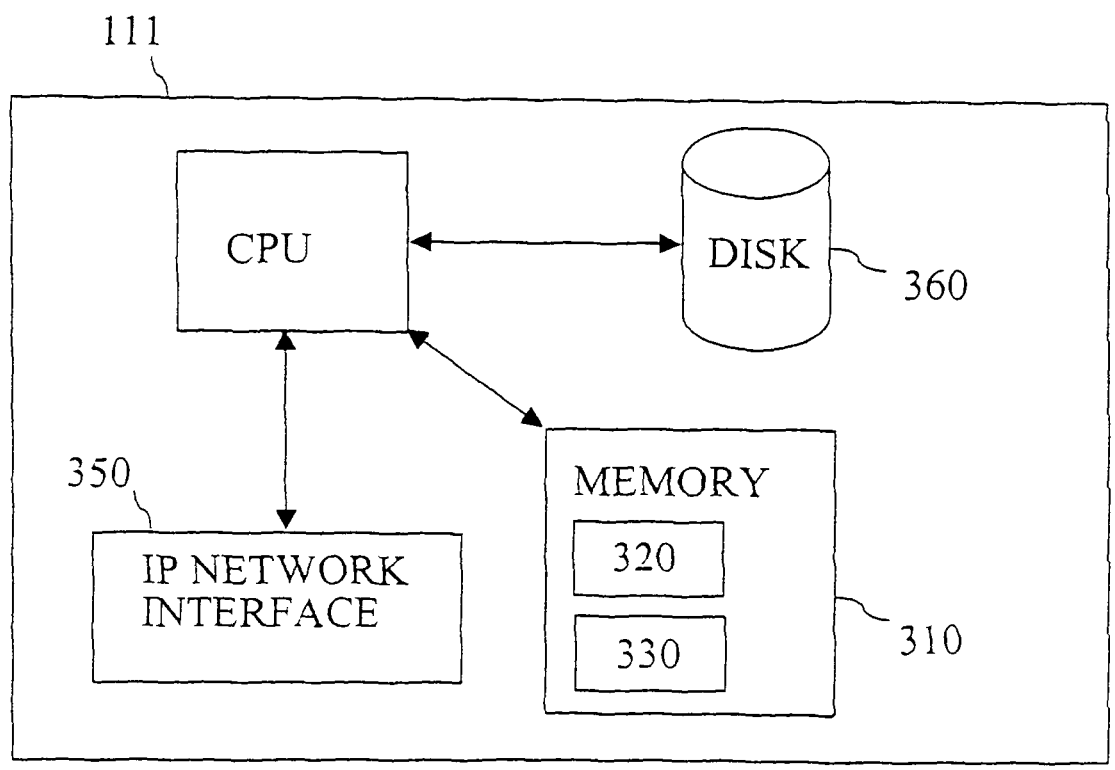
FIG. 10 shows a streaming server according to a preferred embodiment of the invention.

FIG. 10 shows a streaming server 111 according to a preferred embodiment of the invention. The streaming server 111 comprises a processing unit CPU, a first memory 310, an IP network interface 350, and a second memory 360. The first memory 310, the IP network interface 350, and the second memory 360 are coupled to the processing unit CPU.

The processing unit CPU controls, in accordance with computer software stored in the first memory 310, the operation of the streaming server 111, such as processing of requests received from the client device 101 and the sending of prerecorded media streams, stored in the second memory (disk) 360, to the client device 101 via the IP network interface 350.

The software comprises a streaming server software application 320 (hereinafter referred to as server software 320), a protocol stack 330 for implementing the necessary protocol layers such as an RTP layer, an RTSP layer, an SDP layer, a TCP layer, an IP layer and lower protocol layers.

The PAUSE and PLAY messages sent from the client device 101 are received via the IP network interface 350. A processor (not shown) of the processing unit CPU processes the messages according to the server software 320 and the protocol stack 330 and takes appropriate action.

The present invention provides means for reducing the effects of cell reselection on an ongoing streaming session. It is to be noted that, according to preferable embodiments of the invention, a request for resending (e.g. a PLAY message) is sent on the application layer, i.e. between the client software application 220 and the server software application 320. Preferably RTSP over TCP (Transmission Control Protocol) or RTSP over another reliable protocol is used in transferring application layer requests from the client device to the streaming server. The reception of the messages at the streaming server can therefore basically be guaranteed.

Although it has been described that the cell reselection would be performed between two base stations, it should be noted that a cell reselection can be performed also between two sectors of one and the same base station. Also, it should be noted that depending on the implemention, it may well be that separate messages (PAUSE messages) pausing the sending of streaming media are not needed. In an alternative embodiment, both to stop sending streaming media and to start resending streaming media is caused by a single appropriate message.

Further, in relation to the buffer filling embodiment, it has been described in the foregoing that when the server switches to sending a lower bit rate sequence, the original transmission bit rate would be maintained. However, in an alternative embodiment of the invention, a transmission bit rate higher than the original transmission bit rate is used during the filling period in order to fill the buffer more quickly. In this embodiment, it is assumed that a larger bandwidth can be requested by the mobile client device and that a larger bandwidth is actually available in the radio access network.

Further, in relation to the buffer filling embodiment, the bandwidth information of the sequence can be sent to the streaming server 111 also by other means than the RTSP field 'Bandwidth' (for example, by requesting a specific sequence encoded at a bitrate known to the client device 101). In this case, the field 'Bandwidth' is not used, the fields 'Speed' and 'Range' are recalculated according to the actual known sequence bit rate.

It is possible that the network (air-interface) bandwidth changes during the buffer filling period. If the client device 101 supports bandwidth adaptation that involves bit stream switching, the client device 101 should pause the buffer filling (with an RTSP PAUSE message) before sending a bandwidth adaptation message to the streaming server 111. After the bandwidth adaptation operations are over, the client device can start the buffer filling again and recalculate the 'Bandwidth', 'Speed' and 'Range' values according to the bit rate and timing information of the new media stream.

Also, in relation to the buffer filling embodiment, it should be noted that, in an alternative embodiment, the second PAUSE/PLAY messages are not sent at all but the switch back to sending the original media sequence at the original transmission bit rate will be performed automatically by the server based on the stopping point information contained in the first PLAY message.

The resending request mentioned in the various embodiments of the invention may, in certain cases, actually be a sending request. One such case is considered as an alternative embodiment of the invention. In this embodiment, the client device (101) knowing beforehand that a cell reselection is going to occur in the very near future sends a PAUSE message to the streaming server (111) before the beginning of the cell reselection period, i.e. during the pre-CR period). Sending of the PAUSE message is triggered by a cell reselection initiation event notified to the client software 220 by means of the lower layer API. The PAUSE message causes the streaming server 111 to stop sending the streaming media. When the CR-period is over, the client device 101 then sends a PLAY message causing the streaming server to start sending at the point at which sending was stopped before the CR period. Playing of the streaming media is not stopped at the client device 101 in between, and if the client device buffer 240 has been selected to be longer in time than the time that cell reselection takes, the buffer 240 does not become totally empty during cell reselection and the user does not experience any jumps or interruption in playback. The PLAY message may contain a request to send at an increased speed in order to increase the degree of fullness of the buffer 240.

In yet another embodiment, the mobile client device 101 sends, before the CR period, to the streaming server 111 an appropriate message requesting the streaming server 111 to stop sending the streaming media and to start sending again at a suitable point in time after the CR period. Sending of the message is triggered, during the pre-CR period, by a cell reselection initiation event notified to the client software 220 by means of the lower layer API. The mobile client device 101, knowing approximately the time that the cell reselection is going to take, estimates a suitable point in time at which it is again able to receive data. It inserts this information to the message so as to prevent the streaming server 111 from starting to send again too early.

An example of the above mentioned message is as follows:
PLAY rtsp://example.com/foo RTSP1.0
CSeq: 7
Session: 354832
Range: npt=28.00-40.00; time=19970123T153600Z
Bandwidth: 20000
Speed: 1.5

This is an RTSP PLAY message having a header field 'Time'. The value of that field schedules the start of the "future" sending of the streaming media.

Figure 11:
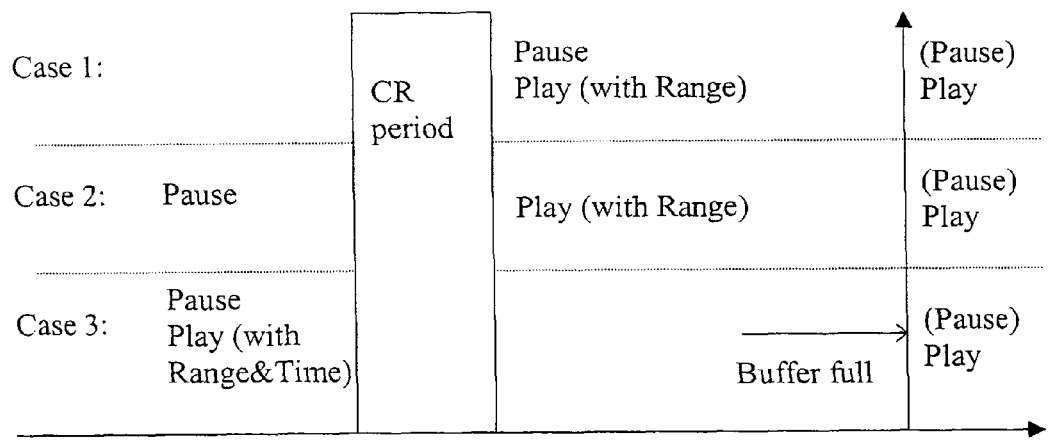
FIG. 11 illustrates three ways of sending messages according to preferred embodiments of the invention.

FIG. 11 illustrates (especially relating to the buffer filling embodiments) the following three ways in which messages may be sent:

Case 1: The first PAUSE and PLAY messages are sent after the CR period. The second PAUSE and PLAY messages are sent when the buffer 240 is full.

Case 2: The first PAUSE message is sent before the CR period. The associated 30 PLAY message is sent after the CR period. The second PAUSE and PLAY messages are sent when the buffer 240 is full.

Case 3: The first PAUSE message is sent before the CR period. The associated PLAY message is sent after the PAUSE message but before the CR period. The second PAUSE and PLAY messages are sent when the buffer 240 is full.

The sending of the second PAUSE message is not necessary, if the first PLAY message contains a closed 'Range' field.

Particular implementations and embodiments of the invention have been described. It is clear to a person skilled in the art that the invention is not restricted to details of the embodiments presented above (e.g. message names and message field names), but that it can be implemented in other embodiments using equivalent means without deviating from the characteristics of the invention. The scope of the invention is only restricted by the attached patent claims.

The invention claimed is:

1. A method, comprising:
   receiving streaming media in a mobile client device from a streaming server over an air interface,
   storing the received streaming media temporarily in a temporary store at the client device before playing,
   detecting a cell reselection event in the mobile client device, and
   in response to the detected cell reselection event, said mobile client device requesting the streaming server to send streaming media which the mobile client device was not able to receive due to the cell reselection, at a rate higher than the playing rate of the media so as to increase a degree of fullness of the temporary store,
   wherein the requesting comprises:
   requesting to switch to sending a lower bit rate streaming media encoded with a bit rate lower than an original bit rate; and
   requesting to speed up transmission of the lower bit rate streaming media, so as to reach an original transmission bit rate.

2. A method according to claim 1, wherein the streaming server is provided with a starting point at which to start sending the requested streaming media.

3. A method according to claim 1, wherein streaming server sends the streaming media which the mobile client device is not able to receive due to said cell reselection as well as a remaining portion of streaming media in response to the request.

4. A method according to claim 1, wherein the cell reselection comprises a cell reselection period during which the mobile client device is not able to receive streaming media, the method comprising:
   sending from the mobile client device to the streaming server, after the cell reselection period, a resending request which requests the streaming server to resend streaming media which the mobile client device was not able to receive during the cell reselection period.

5. A method according to claim 4, wherein the resending request is generated according to real time streaming protocol.

6. A method according to claim 4, wherein the resending request is implemented by a real time streaming protocol PAUSE/PLAY message pair.

7. A method according to claim 1, wherein the temporary store has a size longer in time than a cell reselection period.

8. A method according to claim 1, wherein a bandwidth or desired transmission bit rate with speeding factor is communicated to the streaming server in a request.

9. A method according to claim 1, wherein the streaming media is stored at the mobile client device at a rate higher than the playing rate.

10. A method according to claim 1, wherein the streaming server is subsequently requested to resume an original configuration.

11. A method according to claim 1, wherein the streaming server has a set of media streams available for transmission in which the same media content has been encoded at different bit rates.

12. A method according to claim 11, wherein information on the available set of media streams is beforehand communicated to the mobile client device in a streaming session setup.

13. A method according to claim 12, wherein the streaming server is requested to switch from sending a higher bit rate media stream to sending a lower bit rate media stream at an increased speed.

14. A method according to claim 1, wherein the streaming media comprise one of the following: a video stream, an audio stream, another stream of single media, a multimedia stream.

15. A method according to claim 1, wherein the streaming server sends streaming media to the mobile client device via a mobile communications network.

16. A method according to claim 1, wherein the mobile communications network comprises a mobile packet radio network, such as a general packet radio service network.

17. A method according to claim 1, wherein said cell reselection is performed between two base stations which are selected from a group comprising: base stations belonging to a general packet radio service system, base stations belonging to a third generation mobile communications system.

18. A method according to claim 1, wherein said requesting to send streaming media comprises requesting with an application level request.

19. A method according to claim 1, wherein the streaming server is requested to send the not received streaming media although the temporary store has not become totally empty.

20. A method according to claim 1, wherein said requesting is performed without pausing playback at the mobile client device.

21. A method according to claim 1, wherein the requesting comprises requesting to speed up transmission of the lower bit rate streaming media at a transmission bit rate higher than the original transmission bit rate.

22. A method according to claim 1, wherein the requesting comprises:
specifying a starting point to start sending the lower bit rate streaming media, based on a time of a last received frame before cell reselection; and
specifying a stopping point to stop sending the lower bit rate streaming media, by adding a filling period to the starting point.

23. A method according to claim 22, wherein
the starting point is adjusted such that there will be an intra frame in the lower bit rate streaming media at the starting point; and
the stopping point is adjusted such that there will be an intra frame in the original bit rate streaming media at the stopping point.

24. A mobile client device, comprising:
a receiver configured for receiving streaming media from a streaming server over an air interface,
a temporary store configured for temporarily storing the received streaming media before playing,
a protocol stack configured for detecting a cell reselection event in the mobile client device, and
a processing unit configured for requesting in response to the detected cell reselection event, from said mobile client device, the streaming server to send streaming media which the mobile client device was not able to receive due to a cell reselection, at a rate higher than the playing rate of the media so as to increase a degree of fullness of the temporary store,
wherein the requesting comprises:
requesting to switch to sending a lower bit rate streaming media encoded with a bit rate lower than an original bit rate; and
requesting to speed up transmission of the lower bit rate streaming media, so as to reach an original transmission bit rate.

25. A mobile client device according to claim 24, wherein the request comprises a starting point at which to start sending the requested steaming media.

26. A mobile client device according to claim 24, wherein the cell reselection comprises a cell reselection period during which the mobile client device is not able to receive streaming media, wherein
the mobile client device is configured to send to the streaming server, after the cell reselection period, a resending request which requests the streaming server to resend streaming media which the mobile client device was not able to receive during the cell reselection period.

27. A mobile client device according to claim 24, wherein the mobile client device is configured to use a resending request in accordance with real time streaming protocol.

28. A mobile client device according to claim 24, wherein said requesting to send streaming media comprises requesting with an application level request.

29. A mobile client device according to claim 24, wherein the streaming server is requested to send the not received streaming media although the temporary store has not become totally empty.

30. A mobile client device according to claim 24, wherein said requesting is performed without pausing playback at the mobile client device.

31. A mobile client device according to claim 24, wherein the requesting comprises requesting to speed up transmission of the lower bit rate streaming media at a transmission bit rate higher than the original transmission bit rate.

32. A mobile client device according to claim 24, wherein the requesting comprises:
specifying a starting point to start sending the lower bit rate streaming media, based on a time of a last received frame before cell reselection; and
specifying a stopping point to stop sending the lower bit rate streaming media, by adding a filling period to the starting point.

33. A mobile client device according to claim 32, wherein
the starting point is adjusted such that there will be an intra frame in the lower bit rate streaming media at the starting point; and
the stopping point is adjusted such that there will be an intra frame in the original bit rate streaming media at the stopping point.

34. A streaming server, comprising:
a transmitter configured for sending streaming media to a mobile client device,
a receiver configured for receiving a request requesting the streaming server to send streaming media which the mobile client device was not able to receive due to a cell reselection, at a rate higher than the playing rate of the media so as to increase a degree of fullness of a temporary store at the client device, in which temporary store streaming media received at the mobile client device is temporarily stored before playing, said request having been sent by said mobile client device upon detecting a cell reselection event in the mobile client device, said request comprising:
requesting to switch to sending a lower bit rate streaming media encoded with a bit rate lower than an original bit rate; and
requesting to speed up transmission of the lower bit rate streaming media, so as to reach an original transmission bit rate, and wherein the streaming server comprises:
a processing unit configured for acting upon the received request.

35. A streaming server according to claim 34, wherein the streaming server comprises a memory for storing a set of media streams which are available for transmission in which the same media content has been encoded at different bit rates.

36. A streaming server according to claim 34, wherein the streaming server is configured to communicate information on the available set of media streams beforehand to the mobile client device in a streaming session setup.

37. A streaming server according to claim 34, configured for receiving the request requesting the streaming server to send streaming media which the mobile client device is not able to receive due to the cell reselection, wherein said request is an application level request.

38. A streaming server according to claim 34, configured for acting upon the received request, wherein the request comprises:
a starting point to start sending the lower bit rate streaming media, based on a time of a last received frame before cell reselection; and
a stopping point to stop sending the lower bit rate streaming media, specified by adding a filling period to the starting point.

39. A streaming server according to claim 38, wherein
the starting point is adjusted such that there will be an intra frame in the lower bit rate streaming media at the starting point; and
the stopping point is adjusted such that there will be an intra frame in the original bit rate streaming media at the stopping point.

40. A system comprising a streaming server and a mobile client device, for streaming of media from the streaming server to the mobile client device over an air-interface, the system comprising, at the mobile client device:
a receiver configured for receiving streaming media from the streaming server over the air interface,
a temporary store configured for temporarily storing the received streaming media before playing,
a protocol stack configured for detecting a cell reselection event in the mobile client device, and
a processing unit configured for sending, in response to the detected cell reselection event, a request to the streaming server to send streaming media which the mobile client device was not able to receive due to a cell reselection, at a rate higher than the playing rate of the media so as to increase a degree of fullness of the temporary store, wherein the request comprises:
requesting to switch to sending a lower bit rate streaming media encoded with a bit rate lower than an original bit rate; and
requesting to speed up transmission of the lower bit rate streaming media, so as to reach an original transmission bit rate, the system further comprising, at the streaming server:
a transmitter configured for sending streaming media to a mobile client device,
a receiver configured for receiving said request sent by said mobile client device upon detecting a cell reselection event in the mobile client device; and
a processing unit configured for acting upon the received request.

41. A computer readable medium having a computer program stored thereon and executable in a mobile client device, the computer program comprising:
program code causing the mobile client device to receive streaming media sent from a streaming server;
program code causing the mobile client device store the received streaming media temporarily in a temporary store at the client device before playing;
program code causing the mobile client device to detect a cell reselection event in the mobile client device; and
program code for causing the mobile client device to request in response to the detected cell reselection event, the streaming server to send streaming media which the mobile client device was not able to receive due to a cell reselection, at a rate higher than the playing rate of the media so as to increase a degree of fullness of the temporary store,
wherein the requesting comprises:
requesting to switch to sending a lower bit rate streaming media encoded with a bit rate lower than an original bit rate; and
requesting to speed up transmission of the lower bit rate streaming media, so as to reach an original transmission bit rate.

42. A computer readable medium having a computer program stored thereon and executable in a streaming server, the computer program comprising:
program code causing the streaming server to send streaming media to the mobile client device,
program code for causing the streaming server to receive a request requesting the streaming server to send streaming media which the mobile client device was not able to receive due to a cell reselection, at a rate higher than the playing rate of the media so as to increase a degree of fullness of a temporary store at the client device, in which temporary store streaming media received at the mobile client device is temporarily stored before playing, the request having been sent in response to detecting a cell reselection event in the mobile client device, said request comprising:
requesting to switch to sending a lower bit rate streaming media encoded with a bit rate lower than an original bit rate; and
requesting to speed up transmission of the lower bit rate streaming media, so as to reach an original transmission bit rate, and
program code for causing the streaming server to act upon the received request.

* * * * *